United States Patent
Taino

(10) Patent No.: US 6,189,773 B1
(45) Date of Patent: Feb. 20, 2001

(54) ENVELOPE-TYPE CONTAINER, IN PARTICULAR FOR STOCKINGS AND THE LIKE

(75) Inventor: Luca Taino, Castiglione Delle Stiviere (IT)

(73) Assignee: Golden Lady, S.p.A., Jesi (IT)

( * ) Notice: Under 35 U.S.C. 154(b), the term of this patent shall be extended for 0 days.

(21) Appl. No.: 09/396,679

(22) Filed: Sep. 13, 1999

(30) Foreign Application Priority Data

Sep. 30, 1998 (IT) .............................................. MI98U0636

(51) Int. Cl.[7] .................................................. B65D 27/22
(52) U.S. Cl. ............................................................. 229/84
(58) Field of Search ........................... 229/84, 87.15

(56) References Cited

U.S. PATENT DOCUMENTS

| | | | |
|---|---|---|---|
| 1,461,727 | * 7/1923 | Deubener | 229/84 |
| 1,780,135 | * 10/1930 | Lee | 229/87.15 |
| 1,780,558 | * 11/1930 | Kavanau | 229/87.15 X |
| 2,100,768 | * 11/1937 | Schuknecht | 229/84 X |
| 2,139,958 | * 12/1938 | Jarvis | 229/84 |
| 3,788,539 | * 1/1974 | Vjecsner | 229/84 X |

FOREIGN PATENT DOCUMENTS

1340728 * 12/1973 (GB) ........................................ 229/84

* cited by examiner

Primary Examiner—Jes F. Pascua
(74) Attorney, Agent, or Firm—Hedman, Gibson & Costigan, P.C.

(57) ABSTRACT

An envelope-type container (10), in particular for stockings and the like, is made with a dinked basically flat element (11). The flat element (11) presents lines of facilitated folding (12) which identify one first side (23) of the envelope-type container (10), and, in addition, closing flaps (24, 24') associated to the first side (23), three of the said flaps (24) being folded back along the lines of facilitated folding (12) and being mutually connected to form one second side of the container (10), opposite to the first side (23). Furthermore, the container (10) is accessible through at least one opening (16), removably closeable by means of a fourth closing flap (24'). The fourth closing flap (24') presents an incision (17) to facilitate the operations of opening the container (10) when the latter is closed.

2 Claims, 1 Drawing Sheet

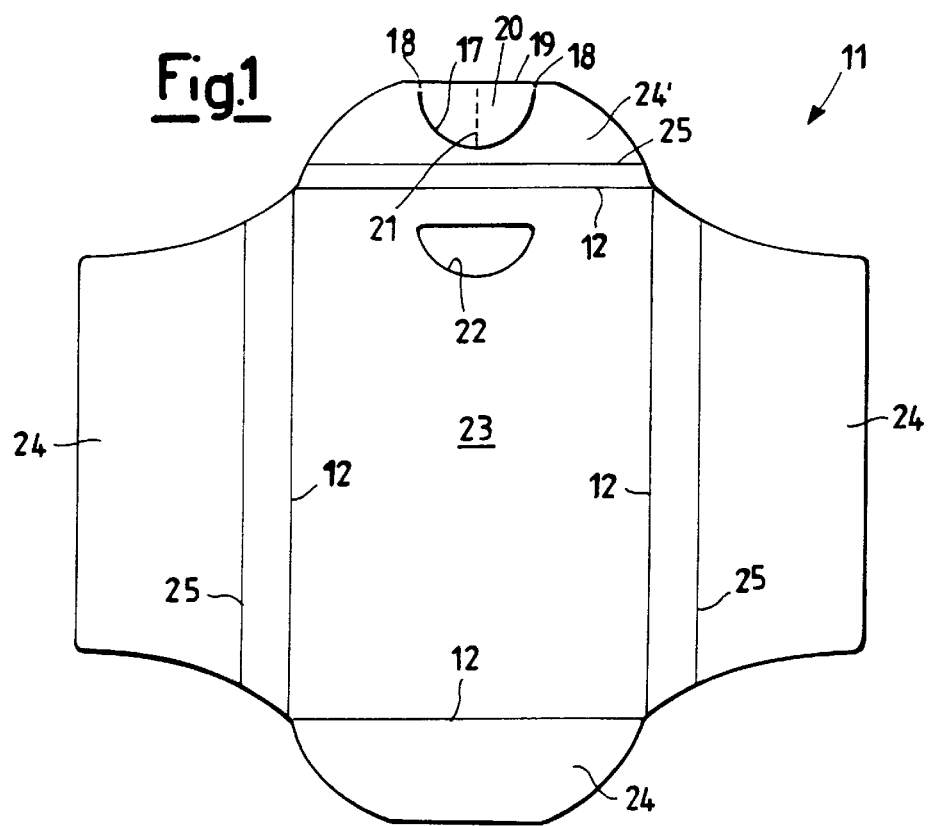
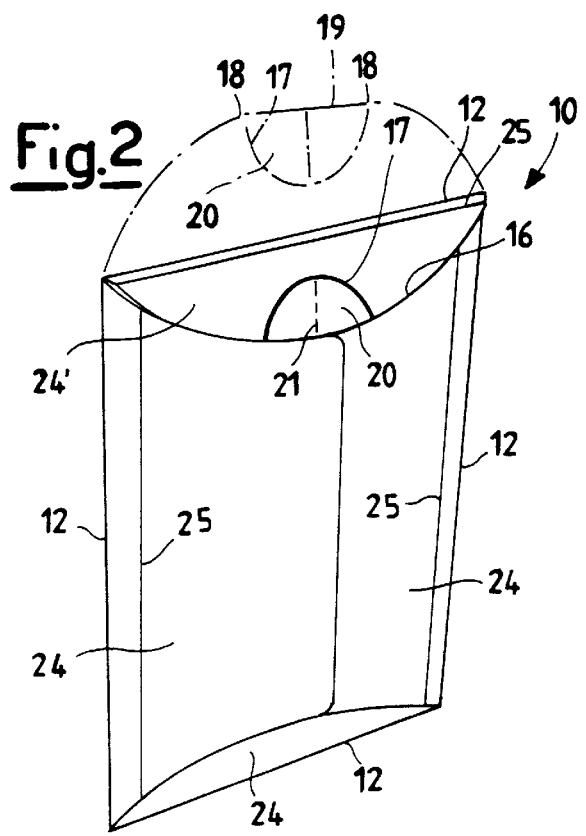
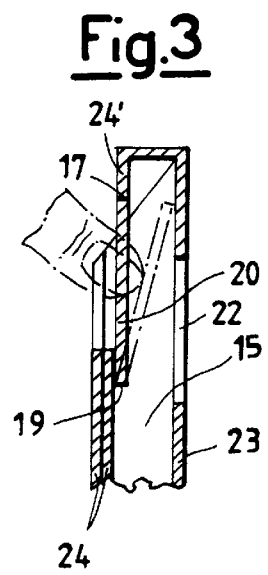

ENVELOPE-TYPE CONTAINER, IN PARTICULAR FOR STOCKINGS AND THE LIKE

BACKGROUND OF THE INVENTION

The present invention refers to an envelope-type container, in particular for stockings and the like.

At present, for the packaging of products of substantially limited dimensions, such as stockings, envelope-type packagings are frequently used.

Usually these packagings consist of a basically plane sheet, for instance made of cardboard and/or card, dinked and folded back on itself to confine the product, such as stockings. The envelope containing the product is then inserted into an envelope of transparent material, such as cellophane or the like.

The envelope envisages an opening, set along one side, which can be re-closed by a closing flap. The envelope can be closed by folding the flap back and blocking it outside the envelope using adhesive or an adhesive label. This closing flap thus prevents accessibility to the inside of the envelope.

Such envelopes notoriously involve very big problems as regards opening. In fact, to open the envelope, it is necessary to remove the closing flap from the external surface of the envelope. This operation frequently causes damage to the envelope itself, and consequently the impossibility of its further use.

It should be further borne in mind that such envelope-type packages are extremely flat and do not allow the product to be adequately displayed unless the packages are simply rested on a plane surface or against supporting elements.

SUMMARY OF THE INVENTION

The purpose of the present invention is to eliminate the drawbacks presented by the known art, making an envelope-type container, in particular for stockings or the like, which can be opened in a basically simple and quick way.

Another purpose of the invention is to make an envelope-type container that can be opened in quite a simple way, in particular without any great risk of its getting damaged.

Another purpose of the invention is to make an envelope-type container that is simple and secure.

A further purpose of the invention is to make an envelope-type container that can be set in a position of vertical display, and not simply rested on a plane surface or against something else.

These and other purposes, according to the present invention, are achieved by making an envelope-type container, in particular for stockings and the like, according to claim 1.

The characteristics and advantages of an envelope-type container, in particular for stockings and the like, according to the present invention will emerge more clearly from the following description, which is given to provide a non-limiting example, with reference to the attached schematic drawings, in which:

BRIEF DESCRIPTION OF THE DRAWINGS

FIG. 1 is a plan view of a dinked plane element of the container, not assembled

FIG. 2 is a perspective view of the dinked plane element shown in FIG. 1, assembled to form a container according to the invention; and FIG. 3 is an enlarged section of a detail of a flap of the container shown in FIG. 2.

DESCRIPTION OF THE PREFERRED EMBODIMENTS

With reference to the above-mentioned figures, an envelope-type container is shown, in particular for stockings and the like, and indicated as a whole by the number 10.

The envelope-type container 10 is made using a dinked plane element 11 made of card or the like, folded back along lines of facilitated folding 12 to form the container 10.

The lines of facilitated folding 12 identify one first side 23 of the container 10, for example of rectangular shape, at the four sides of which are connected three closing flaps 24 and a fourth closing flap 24'. The first flaps 24 are folded back along the lines of facilitated folding 12 and are connected together, for example by adhesive, to form a second side of the container 10 according to the invention, opposite to the first side 23.

The dinked element 11 thus folded back identifies the container 10, which presents a cavity 15, accessible through an opening of its own 16.

The opening 16 enables the introduction and/or the removal of the products from the container 10 and is removably closeable by means of a closing flap 24', which also can be folded back along the lines of facilitated folding 12 to insert an edge 19 of its own inside the cavity 15.

The closing flap 24' and the flaps 24 adjacent to the latter have, according to a preferred embodiment, lines of weakening 25. The lines of weakening 25 are substantially parallel to the lines of facilitated folding 12 and enable a certain thickness to be conferred on the container 10 when the latter is filled with the product. In fact, when the container 10 is filled, the flaps 24, 24' fold preferentially along the lines 25, thus preventing them from folding in an undesired and/or asymmetrical way and perfectly enveloping the contents without leaving any space unused.

The closing flap 24', in addition, presents opening means 17 to facilitate the operations of opening the container 10 when it is closed.

The said opening means 17 consist, for example, of an incision made on the closing flap 24' of the container 10 in the vicinity of its edge 19.

The incision 17 is preferably shaped according to an arc-of-a-circle profile with the ends 18 basically close to the edge 19.

The incision 17 identifies, moreover, a substantially semicircular surface 20 which presents a line of weakening 21.

The line of weakening 21 favours the folding inwards of the surface 20 when the finger of an operator is inserted (FIG. 3) to pull back the closing flap 24' and extract it from the cavity 15, and hence considerably facilitates the operations of opening the container 10.

The line of weakening 21 is obtained, preferentially, along a radius of the semicircular surface 20 and is basically orthogonal to the edge 19 of the closing flap 24'.

The container 10 further has a window 22, on its side 23, which enables the colour of the products and/or the products contained inside to be seen, so enabling a choice to be made according to the purchaser's tastes without it being necessary to open the container 10 itself.

The container 10 can be closed in quite a simple way by inserting the edge 19 of the closing flap 24' inside the cavity 15.

Opening of the container 10 according to the invention is performed basically as follows:

A finger is inserted inside the incision 17, and pressure is applied on the semicircular surface 20. Then, contrasting this force in an area close to the line of facilitated folding 12 of the closing flap 24', the edge 19 of the closing flap 24' is slid out from the inside of the cavity 15 of the container 10, so opening it.

From the description provided above, the characteristics of the envelope-type container, in particular for stockings and the like, which forms the subject of the present invention, are clear, as likewise are the advantages of it.

In particular, the advantages are represented by the extreme simplicity and particular convenience that is achieved when the container is opened according to the invention. In addition, the container can be opened without any risks of it getting damaged.

Furthermore, since the container according to the present invention in any case presents a certain thickness, once it has received the product inside it, it can easily be set in a vertical position when being displayed to the public.

It should also be noted that there is the possibility of positioning the flaps 24 overlapping so as to follow the variable thickness of the product, and then stick them in place using some adhesive means to identify a different envelope-type container thickness. By so doing, the thickness of the container is reduced to the minimum so that the container may be modulated according to how voluminous the product itself is.

It is clear that, in the practical implementation of the invention, the materials, shapes and dimensions of the details illustrated may be any according to the requirements, and they can be replaced with others that use one and the same innovative concept.

What is claimed is:

1. An envelope-type container (10) made from a dinked flat element (11), said flat element (11) having:

(a) lines to facilitate folding (12) which identify a first side (23) of said envelope-type container (10);

(b) three closing flaps (24) and an openable and closable flap (24') associated with said first side (23), said three closing flaps (24) being folded along said lines of facilitated folding (12) and connected to each other to form a second side of said envelope container (10) which is opposite to said first side (23) of said envelope container (10);

(c) said closing flaps (24) and said openable and closeable flap (24') having weakening lines (25) substantially parallel to said lines of facilitated folding (12), said lines of weakening (25) being spaced apart from said lines of facilitated folding (12) to provide thickness to said envelope container; and (d) said envelope container (10) having an opening (16) which allows access to said envelope container (10), said opening (16) being openable and closeable by means of said openable and closable flap (24'), said openable and closable flap (24') having opening means which comprise an semi-circular shaped incision (17) on said openable and closeable flap (24') that forms an inwardly foldable element, said semi-circular shaped incision having ends (18) which prevent said semi-circular incision from extending to an edge (19) of said openable and closeable flap (24'), said semi-circular incision (17) having on a radius of a semi-circular surface at least one line of weakening (21) that facilitates the formation of said inwardly foldable element, said at least one line of weakening (21) being orthogonal to said edges (19) of said openable and closeable flap (24').

2. Envelope-type container according to claim 1, characterized in that it has at least one window (22) on said first side (23) in order to enable the products contained inside said envelope-type container to be seen.

* * * * *